United States Patent
Blackman

(10) Patent No.: US 7,388,299 B2
(45) Date of Patent: Jun. 17, 2008

(54) RETROFITTABLE POWER DISTRIBUTION SYSTEM FOR A HOUSEHOLD

(76) Inventor: Tracy Blackman, 684 Red Fern Rd., Havana, FL (US) 32333

( * ) Notice: Subject to any disclaimer, the term of this patent is extended or adjusted under 35 U.S.C. 154(b) by 12 days.

(21) Appl. No.: 11/472,041

(22) Filed: Jun. 21, 2006

(65) Prior Publication Data
US 2007/0296221 A1  Dec. 27, 2007

(51) Int. Cl.
  F01C 13/00  (2006.01)
  F02C 6/00   (2006.01)
  H02P 9/04   (2006.01)
  F02N 11/00  (2006.01)

(52) U.S. Cl. .................. 290/4 R; 290/38 R; 290/1 A
(58) Field of Classification Search .............. 290/1 A, 290/1 R, 38 R, 4 R
See application file for complete search history.

(56) References Cited

U.S. PATENT DOCUMENTS

| 2,579,126 | A | * | 12/1951 | Pielstick | 290/4 C |
| 3,230,381 | A | * | 1/1966 | Grinnell et al. | 290/4 R |
| 3,678,284 | A | * | 7/1972 | Peters | 290/1 R |
| 3,805,139 | A |   | 4/1974 | Hoffman et al. | |
| 4,150,300 | A | * | 4/1979 | Van Winkle | 290/2 |
| 4,203,041 | A | * | 5/1980 | Sachs | 307/67 |
| 4,229,661 | A | * | 10/1980 | Mead et al. | 290/44 |
| 4,366,390 | A |   | 12/1982 | Rathmann | |
| 4,797,566 | A |   | 1/1989 | Nozki et al. | |
| 4,827,152 | A | * | 5/1989 | Farkas | 307/68 |
| 5,159,259 | A | * | 10/1992 | Hart et al. | 320/123 |
| 5,221,862 | A |   | 6/1993 | Fiorina et al. | |
| 5,373,198 | A | * | 12/1994 | Lopez Jimenez | 307/68 |
| 5,422,518 | A |   | 6/1995 | Sashida | |
| 5,489,765 | A | * | 2/1996 | Fezza | 219/483 |
| 5,747,887 | A |   | 5/1998 | Takanaga et al. | |
| 6,522,031 | B2 |   | 2/2003 | Provanzana et al. | |
| 6,900,556 | B2 |   | 5/2005 | Provanzana et al. | |
| 7,095,126 | B2 | * | 8/2006 | McQueen | 290/1 A |
| 7,230,344 | B2 | * | 6/2007 | Pollack et al. | 290/40 C |
| 2002/0041126 | A1 |   | 4/2002 | Provanzana et al. | |
| 2003/0047209 | A1 |   | 3/2003 | Yanai et al. | |
| 2004/0012204 | A1 | * | 1/2004 | Walter et al. | 290/36 R |
| 2004/0178636 | A1 | * | 9/2004 | Iwanami et al. | 290/40 C |
| 2006/0152007 | A1 | * | 7/2006 | Ortiz | 290/1 R |
| 2007/0130950 | A1 | * | 6/2007 | Serkh et al. | 60/698 |
| 2007/0296222 | A1 | * | 12/2007 | Blackman | 290/1 A |
| 2007/0296276 | A1 | * | 12/2007 | Blackman | 307/64 |

* cited by examiner

Primary Examiner—Julio Gonzalez

(57) ABSTRACT

A power distribution system for retrofitting to households and other buildings. The power distribution system includes a means for supplying energy to the power distribution system for an indeterminate period of time. The power distribution system further comprises a means for converting the energy supplied to the power distribution system into motion. A generator is operatively connected to the energy converting means and converts the motion produced by the energy converting means into an electric current. The electric current produced by the generator is used to power a high-load circuit. An alternator is also operatively connected to the energy converting means. The alternator is configured to convert the motion produced by the energy converting means into another electric current. The alternator transmits this electric current to a bank of batteries which stores the charge. An inverter is electrically connected to the bank of batteries and transmits an electric current from the bank of batteries to a low-load circuit.

13 Claims, 3 Drawing Sheets ion # US 7,388,299 B2

RETROFITTABLE POWER DISTRIBUTION SYSTEM FOR A HOUSEHOLD

BACKGROUND OF THE INVENTION

1. Field of the Invention

This invention relates to the field of household power distribution systems. More specifically, this invention comprises a retrofittable power distribution system for delivering power to a household or other building via high-load and low-load power circuits.

2. Description of the Related Art

Various power distribution systems exist for household applications. Most households obtain power from a common electrical power grid as a primary power source. Some of the other power systems serve as a back-up power supply for the household when the household's primary power source is not functional. Most back-up power supply systems are stand-alone systems which operate independently of the household's primary power source. Gas-powered generators are the most common back-up power supply systems. Gas-powered generators are generally activated manually when a household loses power provided by the primary power system.

In addition, some power systems are auxiliary systems to assist the household's primary power source. Some households obtain power from "renewable" sources to supplement power received from the household's primary power source. As an example, some households obtain power or energy from solar or geothermal sources in addition to using power from the common electrical power grid. Although these alternative sources may also be used as a back-up power supply, household which utilize these alternative power sources often draw power from these alternative sources on a continuous basis.

Although many power systems exist for serving various household power and energy needs, there remains a need for a retrofitting power system that can both serve continuous operating and back-up power needs for a household. Back-up generators usually require a supply of gasoline for long-term operation. When a community loses power, there is often a shortage of gasoline because of inoperability of fuel station pumps and increased demand on limited gasoline supplies. Also, power from "renewable" sources can be expensive or otherwise impractical to obtain for some households.

It is therefore desirable to provide a retrofitted power distribution system which can provide power to a household for both back-up and continuous operation needs.

BRIEF SUMMARY OF THE INVENTION

The present invention is a power distribution system for retrofitting to a household or other building. The power distribution system includes a means for supplying energy to the power distribution system for an indeterminate period of time. The power distribution system further comprises a means for converting the energy supplied to the power distribution system into motion. A generator is operatively connected to the energy converting means and converts the motion produced by the energy converting means into an electric current. The electric current produced by the generator is used to power a high-load circuit.

An alternator is also operatively connected to the energy converting means. The alternator is configured to convert the motion produced by the energy converting means into electric current in a separate circuit. The alternator transmits this electric current to a bank of batteries which stores the charge. An inverter is electrically connected to the bank of batteries and transmits an electric current from the bank of batteries to a low-load circuit. As such, the present invention acts as an energy storage system.

Various energy converting means which are capable of converting energy to motion may be employed in the present invention. In one example, an electric motor is connected to the household's electrical power source. The generator and alternator may both be coupled to the main pulley of the motor. In another example, a boiler and steam engine may be used to rotate an output shaft. The alternator and generator may be connected to pulleys on the output shaft. In yet another example, the alternator and generator are coupled to the main pulley of a gas-combusting engine. The gas-combustion engine receives its fuel supply from a gas feed line integrated with the household.

The high-load circuit includes high-wattage household loads such as the household's air conditioner and low-wattage household appliances. The generator is configured to supply high current 110 volt or high current 220 volt power. The low-load circuit includes low-wattage household loads such as televisions, satellite receivers, computers, and lighting. The battery bank runs the DC to AC inverter producing 110 VAC. This is relatively "clean" low wattage AC power which is suitable for the aforementioned low-wattage household loads.

The power distribution system may be controlled by a main switch. The user turns on the main switch when high-load appliances are being used. The user turns off the main switch when only low-wattage loads are being used. The main switch may further be integrated with the HVAC thermostat so that the energy converting means is activated when air conditioning or heating is needed.

DETAILED DESCRIPTION OF THE INVENTION

Figure 1:
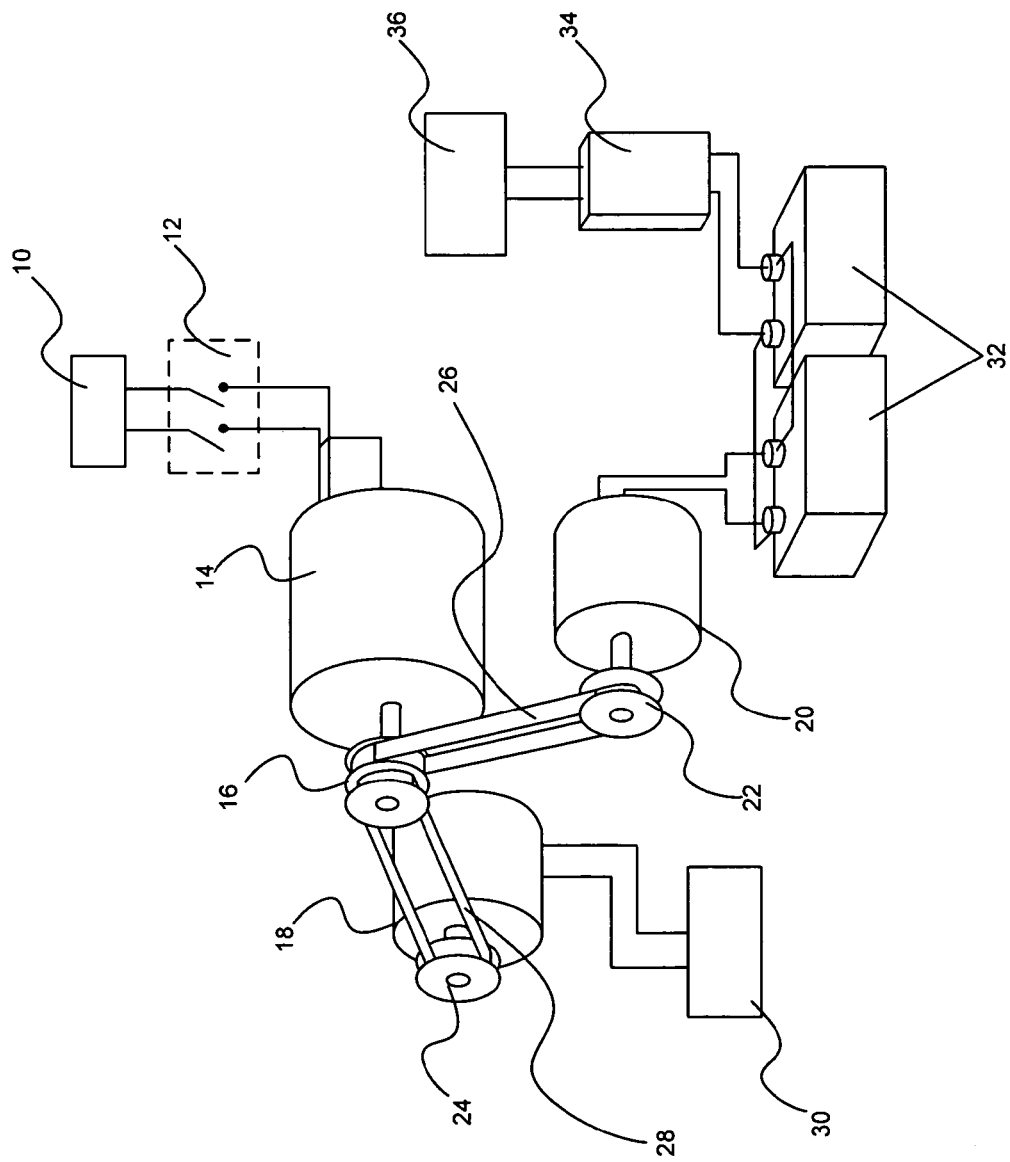
FIG. 1 is a perspective view, showing the present invention.

The present invention, a power distribution system for retrofitting to a household or other building, is illustrated in FIG. 1. The power distribution system includes a means for supplying energy to the power distribution system for an indeterminate period of time. In the current example, the power distribution system receives electrical power from electrical power source 10. Electrical power source 10 may be the household's primary electrical power source. For example, the household owner may use the main power input to the household's primary electrical load center as an input to the power distribution system.

The power distribution system further comprises a means for converting the energy supplied to the power distribution system into motion. Various energy converting means capable of converting energy to motion may be employed in the present invention. In the example illustrated in FIG. 1, electric motor 14 is used to convert electrical energy into rotational motion of an output shaft. Main pulley 16 is attached to the output shaft of electric motor 14 and rotates along with the output shaft.

Generator 18 is operatively connected to main pulley 16 and converts the motion produced by the electric motor 14 into an electric current. Belt 28 connects pulley 24 of generator 18 to main pulley 16 so that pulley 24 rotates along with main pulley 16. The electric current produced by generator 18 is used to power high-load circuit 30. High-load circuit 30 includes high-wattage household loads such as the household's air conditioner and low appliances. Generator 18 is configured to supply high current 110 volt or high current 220 volt power. This is an alternating current circuit.

Alternator 20 is also operatively connected to electric motor 14. Alternator 20 is configured to convert the motion produced by electric motor 14 into another electric current. This is a direct current circuit. Alternator 20 may also be a magneto or AC charger. Belt 26 connects pulley 22 of alternator 20 to main pulley 16 so that pulley 22 rotates along with main pulley 16. Alternator 20 transmits this direct electric current to a bank of batteries 32 which stores the charge. Inverter 34 is electrically connected to the bank of batteries 32 and transmits an electric current from the bank of batteries 32 to low-load circuit 36. It should be noted that energy storage devices other than batteries may similarly be used. The low-load circuit includes low-wattage household loads such as televisions, satellite receivers, computers, and lighting. The bank of batteries 32 runs a direct current to inverter 34 which converts the DC input to 110 VAC. This is relatively "clean" low wattage AC power which is suitable for the aforementioned low-wattage household loads.

The power distribution system may be controlled by a main switch, illustrated by switch 12. The user turns on the main switch when high-load appliances are being used. The user turns off the main switch when only low-wattage loads are being used. The main switch may further be integrated with the HVAC thermostat so that electric motor 14 is activated when air conditioning or heating is needed. Also, the system stores power from the main power source for later use. This allows the user to have the option of storing power during off-peak rate hours, like the middle of the night. Obviously, the system illustrated in FIG. 1 would store energy anytime the high-load circuit is in use.

Figure 2:
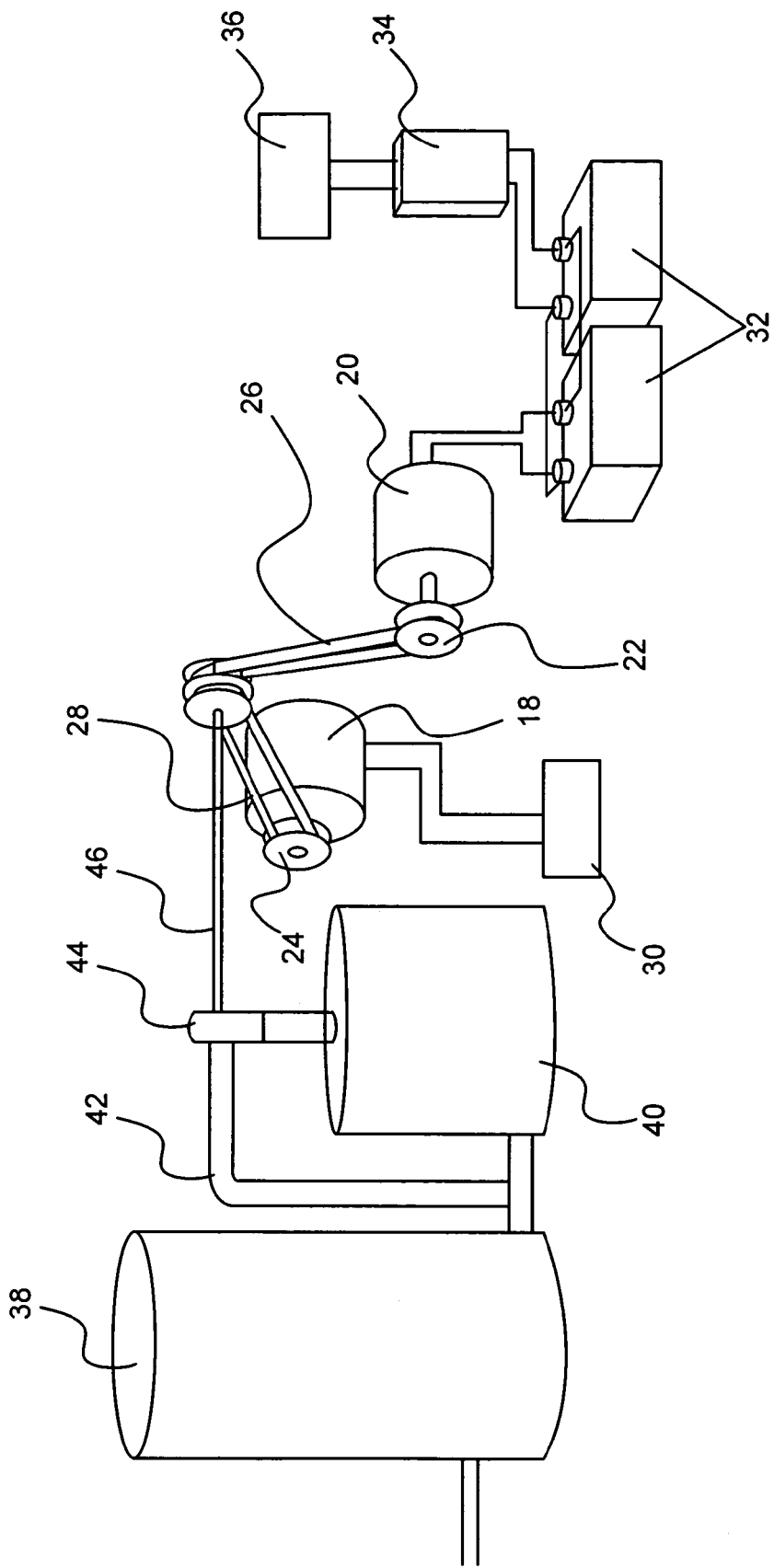
FIG. 2 is a perspective view, showing an alternate embodiment of the present invention.

Another embodiment of the present invention is illustrated in FIG. 2. Boiler 40 is fluidly connected to the household's water heater 38. Boiler 40 produces steam which powers steam engine 44. Boiler 40 may be electric or gas powered. The kinetic energy of steam produced by boiler 40 is converted to motion with steam engine 44. Although a steam turbine type steam engine is illustrated in FIG. 2, many different types of steam engines may be used for steam engine 44. Rotation of the turbine in steam engine 44 causes rotation of output shaft 46 and pulleys attached to output shaft 46. Conduit 42 is provided for recirculation of steam to boiler 40.

Similar to the embodiment illustrated in FIG. 1, generator 18 is operatively connected to a pulley on output shaft 46 and converts the motion produced by steam engine 44 into an electric current. Belt 28 connects pulley 24 of generator 18 to the pulley on output shaft 46 so that pulley 24 rotates along with the pulley. The electric current produced by generator 18 is used to power high-load circuit 30. As in the previous embodiment, high-load circuit 30 includes high-wattage household loads such as the household's air conditioner and low appliances. Generator 18 is configured to supply high current 110 volt or high current 220 volt power.

Alternator 20 is also operatively connected to steam engine 44. Alternator 20 is configured to convert the motion produced by steam engine 44 into another electric current. Belt 26 connects pulley 22 of alternator 20 to a pulley on output shaft 46 so that pulley 22 rotates along with the pulley. Alternator 20 transmits this electric current to a bank of batteries 32 which stores the charge. Inverter 34 is electrically connected to the bank of batteries 32 and transmits an electric current from the bank of batteries 32 to low-load circuit 36. As in the previous embodiment, low-load circuit 36 includes low-wattage household loads such as televisions, satellite receivers, computers, and lighting. The bank of batteries 32 runs a direct current to inverter 34 producing 110 VAC.

Figure 3:
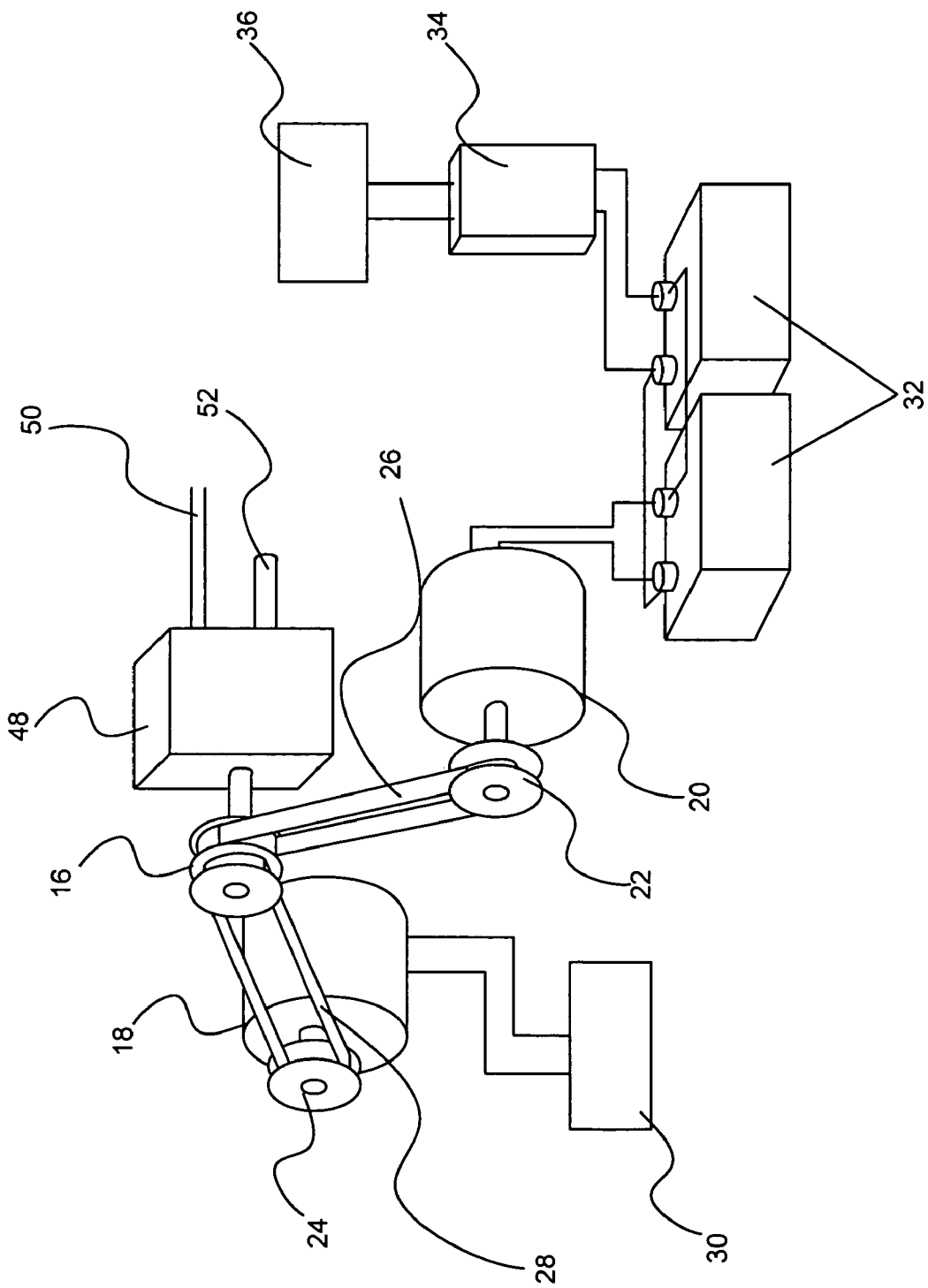
FIG. 3 is a perspective view, showing an alternate embodiment of the present invention.

Yet another embodiment of the present invention is illustrated in FIG. 3. Gas engine 48 is a gas-combustion engine configured to combust liquefied petroleum gas, natural gas, propane or other gaseous fuel source. Gas feed line 50 supplies gas engine 48 with a continuous supply of fuel. If the household is plumbed for natural gas, gas feed line 50 may be plumbed directly to the household's natural gas feed line. Gas engine 48 exhausts byproducts of the combustion process through exhaust 52. Gas engine 48 converts combustion energy into the rotation of an output shaft and main pulley 16.

Similar to the embodiment illustrated in FIGS. 1 and 2, generator 18 is operatively connected to main pulley 16 and converts the motion produced by gas engine 48 into an electric current. Belt 28 connects pulley 24 of generator 18 to main pulley 16 so that pulley 24 rotates along with main pulley 16. The electric current produced by generator 18 is used to power high-load circuit 30. As in the previous embodiments, high-load circuit 30 includes high-wattage household loads such as the household's air conditioner and low appliances. Generator 18 is configured to supply high current 110 volt or high current 220 volt power.

Alternator 20 is also operatively connected to gas engine 48. Alternator 20 is configured to convert the motion produced by gas engine 48 into another electric current. Belt 26 connects pulley 22 of alternator 20 to main pulley 16 so that pulley 22 rotates along with main pulley 16. Alternator 20 transmits this electric current to a bank of batteries 32 which stores the charge. Inverter 34 is electrically connected to the bank of batteries 32 and transmits an electric current from the bank of batteries 32 to low-load circuit 36. As in the previous embodiments, low-load circuit 36 includes low-wattage household loads such as televisions, satellite receivers, computers, and lighting. The bank of batteries 32 runs a direct current to inverter 34 producing 110 VAC.

Gas engine 48 and boiler 40 may also be activated by a main switch like the electric motor embodiment illustrated in FIG. 1. The main switch may also be integrated with the household's thermostat so that the main switch is turned on when air-conditioning or heating is needed. When large appliances are not being used, low-load circuit 30 may run off the stored charge in batteries 32.

The benefits of the proposed power distribution system are numerous. Those that are skilled in the art know that the proposed power distribution system is easy to retrofit and integrate into the existing power distribution systems of most households. In the electric motor embodiment, the power distribution system may be integrated to the household through the primary load center. The main power input line to the household may be routed to electric motor 14 through switch 12. The outputs of the power distribution system from generator 18 and inverter 34 may be electrically connected to the appropriate household circuits.

In the steam engine embodiment, boiler 14 may be fluidly connected to the existing water heater. The gas or electric heating elements of boiler 40 may be powered by the household's main power input line or the household's gas supply line, respectively. The outputs of the power distribution system from generator 18 and inverter 34 may be electrically connected to the appropriate household circuits at the junction box.

In the gas engine embodiment, gas engine 48 may be powered by the household's gas supply line. The outputs of the power distribution system from generator 18 and inverter 34 may be electrically connected to the appropriate household circuits at the junction box.

The proposed power distribution system provides both back-up power and continuous operation power capabilities. The previous description illustrates how the power distribution system may be used for continuous operation. For back-up power applications, the high-load circuit 30 and low-load circuit 36 remain electrically connected to electrical power source 10. In the electric motor variant, generator 18 may be removed or disconnected from the system so that high-load circuit 30 remains powered by electrical power source 10. The power distribution system is electrically connected to low-load circuit 36 through a switch. The user may turn the switch to the "on" position when the household is not receiving power from electrical power source 10, such as in a power outage. Batteries 32 then provide back-up power to low-load circuit 36 through inverter 34.

If the gas engine embodiment or the steam engine with gas heating element embodiment is used, the power distribution system may serve a back-up power function for high-load circuit 30 as well. For example, the household may continue to use electric power source 10 to power high-load circuit 30 and low low-load circuit 36 when electric power is available. When electric power is unavailable, however, the user may turn a switch to the "on" position to activated boiler 40 or gas engine 48.

The proposed power distribution system is particularly well-suited for households geographically situated in regions which routinely experience blackouts and brownouts. The energy converting means may operate during non-peak operating times (i.e., times when the community's electrical demands are not as high). It should be noted that the gas engine embodiment and the steam engine with gas heating element embodiment may be operated continuously in these geographic regions. It should be further noted that even the electrical input variant may be used continuously as well. In the event of a power outage, however, the system would be unable to operate high wattage loads. Low-wattage loads, such as the lighting may still be used since these loads obtain their power from energy stored in the bank of batteries.

The preceding description contains significant detail regarding the novel aspects of the present invention. It should not be construed, however, as limiting the scope of the invention but rather as providing illustrations of the preferred embodiments of the invention. As an example, generator 18 and alternator 20 may be operatively connected to the energy converting means in various ways. For example, gears may be used in place of the pulleys, pulleys, and belts. In addition, the system and switches may be computer controlled so that the user can set certain intervals when the components of the system would be used. Such a variation would not alter the function of the invention. Thus, the scope of the invention should be fixed by the following claims, rather than by the examples given.

Having described my invention, I claim:

1. A power distribution and storage system for households and other buildings, said system comprising:

a). a first means for supplying energy to said power distribution system for an indeterminate period of time said first means including an AC line power source configured to transmit electric power to said power distribution system and said households and other buildings, said first means further including a gas feed line configured to transmit a combustible gas to said power distribution system and said households and other buildings;

b). a second means for converting said energy supplied to said power distribution system into motion;

c). a generator operatively connected to said second means, said generator configured to convert said motion produced by said second means into a first electric current transmitted to a high-load circuit, wherein said first electric current is a high wattage alternating current;

d). an alternator operatively connected to said second means, said alternator configured to convert said motion produced by said second means into a second electric current transmitted to at least one battery, wherein said second electric current is a direct current; and e). an inverter electrically connected to said at least one battery, said inverter configured to transform direct current from said second electric current or said at least one battery into a low-wattage alternating current which is then fed to a low-load circuit.

2. The power distribution system of claim 1, said second means further comprising an electric motor.

3. The power distribution system of claim 1, said second means further comprising a steam engine.

4. The power distribution system of claim 3, said first means further comprising a boiler.

5. The power distribution system of claim 1, said second means further comprising a gas engine.

6. The power distribution system of claim 1, wherein said high-load circuit further comprises an air-conditioner configured to cool said households and other buildings.

7. The power distribution system of claim 1, wherein said high-load circuit further comprises high-wattage loads for said households and other buildings.

8. The power distribution system of claim 1, wherein said low-load circuit further comprises a television.

9. The power distribution system of claim 6, wherein said low-load circuit further comprises low-wattage loads for said households and other buildings.

10. The power distribution system of claim 1, wherein said low-load circuit further comprises lighting configured to illuminate the interior of said households and other buildings.

11. The power distribution system of claim 3, wherein said steam engine further comprises a turbine configured to rotate an output shaft.

12. The power distribution system of claim 1, further comprising a switch having an on position and an off position, said switch configured to activate said second means when said switch is positioned in said on position.

13. The power distribution system of claim 12, wherein said switch is electronically connected to a thermostat of said households and other buildings, said switch configured to activate said second means.

\* \* \* \* \*

UNITED STATES PATENT AND TRADEMARK OFFICE
CERTIFICATE OF CORRECTION

PATENT NO. : 7,388,299 B2  
APPLICATION NO. : 11/472041  
DATED : June 17, 2008  
INVENTOR(S) : Tracy Blackman Page 1 of 1

It is certified that error appears in the above-identified patent and that said Letters Patent is hereby corrected as shown below:

In the Abstract:  
In line 3, the following words should be deleted "power distribution";  
In line 4, the following words should be deleted "power distribution";  
In line 6, the following words should be deleted "power distribution".

In the Claims:  
In column 6, line 42, 9. The power distribution system of claim "6" should be changed to The power distribution system of claim --1--.

Signed and Sealed this

Thirtieth Day of September, 2008

JON W. DUDAS  
*Director of the United States Patent and Trademark Office*